US011376509B2

(12) United States Patent
Huang

(10) Patent No.: US 11,376,509 B2
(45) Date of Patent: Jul. 5, 2022

(54) VIRTUAL OBJECT GROUPING METHOD AND DEVICE, STORAGE MEDIUM, AND ELECTRONIC DEVICE

(71) Applicant: NETEASE (HANGZHOU) NETWORK CO., LTD., Zhejiang (CN)

(72) Inventor: Haidong Huang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/648,258

(22) PCT Filed: Jul. 12, 2019

(86) PCT No.: PCT/CN2019/095723
§ 371 (c)(1),
(2) Date: Mar. 18, 2020

(87) PCT Pub. No.: WO2020/181698
PCT Pub. Date: Sep. 17, 2020

(65) Prior Publication Data
US 2021/0402306 A1 Dec. 30, 2021

(30) Foreign Application Priority Data
Mar. 14, 2019 (CN) .......................... 201910194491.0

(51) Int. Cl.
*A63F 13/795* (2014.01)
*A63F 13/2145* (2014.01)
(Continued)

(52) U.S. Cl.
CPC ........ *A63F 13/795* (2014.09); *A63F 13/2145* (2014.09); *A63F 13/52* (2014.09);
(Continued)

(58) Field of Classification Search
USPC .......................................................... 463/31
See application file for complete search history.

(56) References Cited

U.S. PATENT DOCUMENTS 10,255,302 B1 * 4/2019 Cosic ..................... G06F 16/252
10,909,981 B2 * 2/2021 Bai ......................... G06F 3/167
(Continued)

FOREIGN PATENT DOCUMENTS

CN 102402643 A 4/2012
CN 108786117 A 11/2018
(Continued)

OTHER PUBLICATIONS

Corresponding CN application search report dated Mar. 27, 2020.
(Continued)

*Primary Examiner* — Pierre E Elisca
(74) *Attorney, Agent, or Firm* — Gang Yu

(57) ABSTRACT

The present disclosure provides a virtual object grouping method and device, a storage medium, and an electronic device. The method includes: in response to a grouping instruction, an operation state for grouping the at least one virtual object in a predetermined display area is activated; in response to a first selection instruction, at least one target virtual object to be grouped is selected from the at least one virtual object; in response to a second selection instruction, a target group is selected from at least one pre-created group; and the at least one target virtual object to be grouped is grouped into the target group. By means of embodiments of the present disclosure, the problems of small player operation space and low game operability in the related art are solved.

20 Claims, 11 Drawing Sheets

(51) Int. Cl.
*A63F 13/52* (2014.01)
*A63F 13/60* (2014.01)
*G06F 3/0482* (2013.01)
*G06F 3/0484* (2022.01)
*G06F 3/04883* (2022.01)
*A63F 13/822* (2014.01)

(52) U.S. Cl.
CPC ............ *A63F 13/60* (2014.09); *G06F 3/0482* (2013.01); *G06F 3/0484* (2013.01); *G06F 3/04883* (2013.01); *A63F 13/822* (2014.09); *A63F 2300/1075* (2013.01); *A63F 2300/308* (2013.01); *A63F 2300/5566* (2013.01)

(56) References Cited

U.S. PATENT DOCUMENTS

| | | | | |
|---|---|---|---|---|
| 11,036,695 | B1* | 6/2021 | Cosic | ............ G06F 3/011 |
| 2014/0066157 | A1* | 3/2014 | Sahm | ............ G07F 17/3225 |
| | | | | 463/17 |
| 2017/0206803 | A1* | 7/2017 | Park | ............ H04W 4/33 |
| 2018/0375987 | A1* | 12/2018 | Yao | ............ H04M 1/72415 |

FOREIGN PATENT DOCUMENTS

| | | |
|---|---|---|
| CN | 109126133 A | 1/2019 |
| WO | 2015037732 A | 3/2015 |

OTHER PUBLICATIONS

Wang, Yixiang <Digital Media Design>; Jul. 2013; p. 33-34.
Liang, Zhe <Interaction Design> Nov. 2016; p. 68-77.
Gamersky <<StarCraft II > Formation Strategy; Formation Skills and Formation Technique> https://www.sohu.com/a/41134448_119573 Nov. 11, 2015 ; p. 1-4.

* cited by examiner

Fig. 5
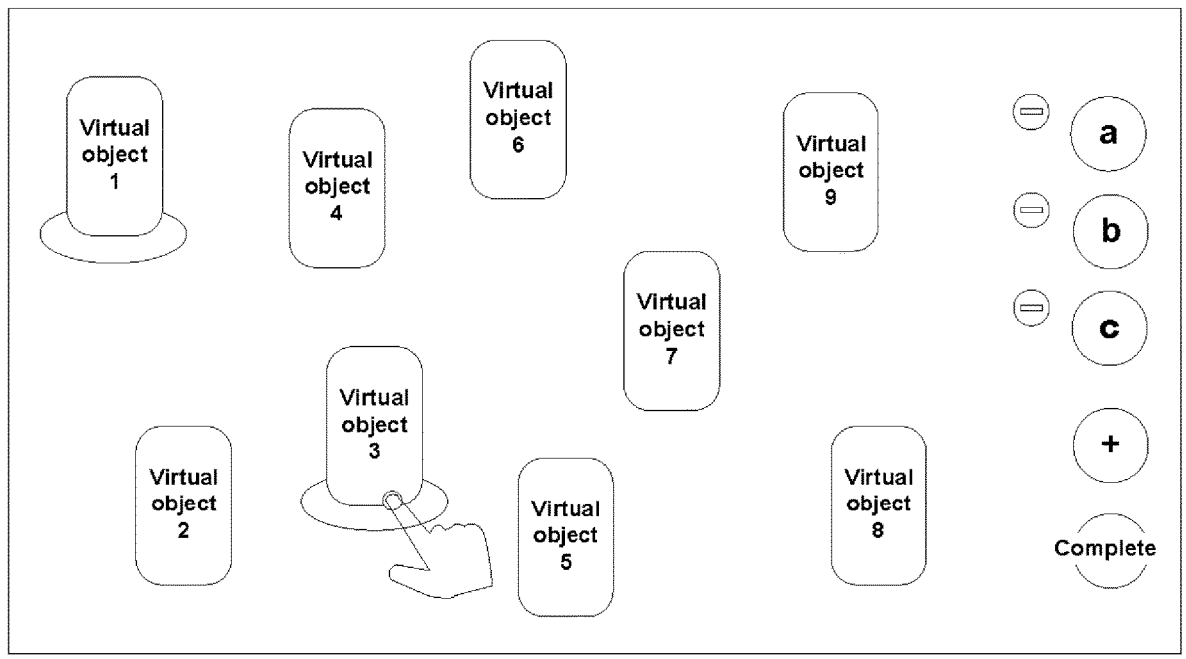
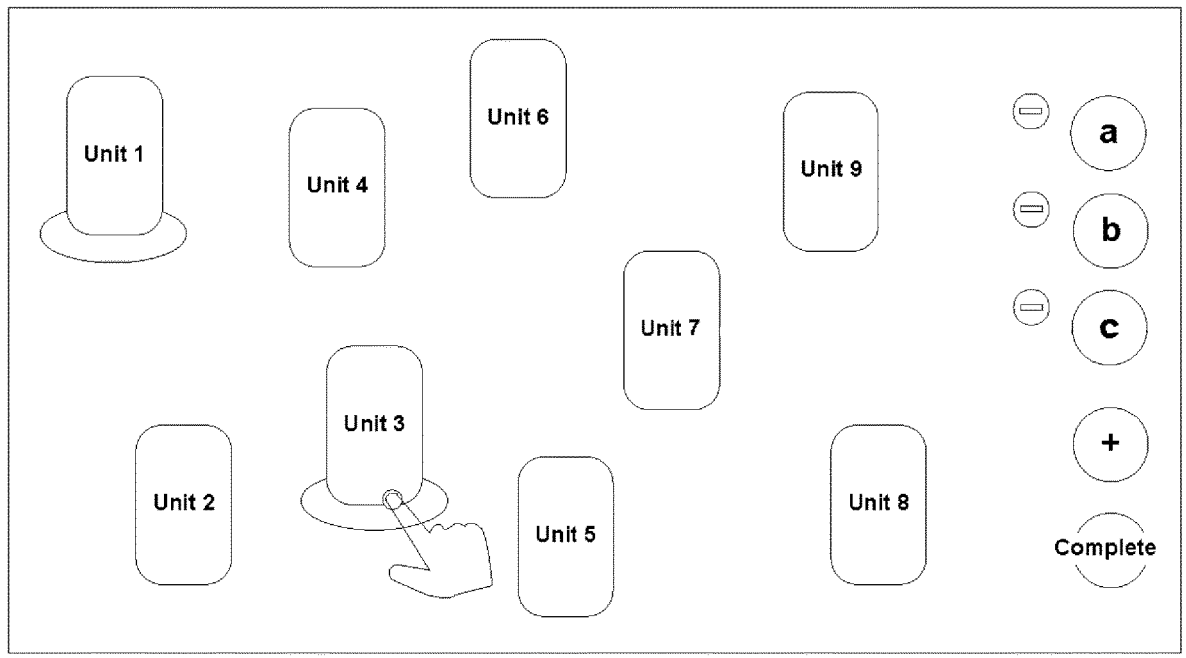

VIRTUAL OBJECT GROUPING METHOD AND DEVICE, STORAGE MEDIUM, AND ELECTRONIC DEVICE

CROSS-REFERENCE TO RELATED APPLICATIONS

The present disclosure claims benefit of China Patent Application No. 201910194491.0, filed on Mar. 14, 2019, contents of which are hereby incorporated by reference in its entirety.

TECHNICAL FIELD

The present disclosure relates to the field of communications, and in particular to a virtual object grouping method and device, a storage medium, and an electronic device.

BACKGROUND

In mobile terminal games (for example, smart phone games), due to device restrictions, a player cannot usually operate multiple virtual objects at the same time. Even if multiple virtual objects can be operated, virtual object groups are usually fixed, and the player cannot operate personalized groups during actual operations.

SUMMARY

At least some embodiments of the present disclosure provide a virtual object grouping method and device, a storage medium, and an electronic device, so as at least to partially solve problems of small player operation space and low game operability in the related art.

In an embodiment of the present disclosure, a virtual object grouping method is provided. This method is applied to a mobile terminal having at least one processor for executing a software application and a touch screen which is rendered with a graphical user interface. Contents rendered on the graphical user interface at least partially including at least one virtual object. The method includes that: in response to a grouping instruction, an operation state for grouping the at least one virtual object in a predetermined display area is activated; in response to a first selection instruction, at least one target virtual object to be grouped is selected from the at least one virtual object, and in response to a second selection instruction, a target group is selected from at least one pre-created group; and the at least one target virtual object is grouped into the target group.

In another embodiment of the present disclosure, a virtual object grouping device is provided. The device is applied to a mobile terminal having at least one processor for executing a software application and a touch screen which is rendered with a graphical user interface. Contents rendered on the graphical user interface at least partially including at least one virtual object. The device includes: an activation component, configured to activate, in response to a grouping instruction, an operation state for grouping the at least one virtual object in a predetermined display area; a determination component, configured to select, in response to a first selection instruction, at least one target virtual object to be grouped from the at least one virtual object, and select, in response to a second selection instruction, a target group from at least one pre-created group; and a grouping component, configured to group the at least one target virtual object to be grouped into the target group.

In another embodiment of the present disclosure, a storage medium is also provided. The storage medium stores a computer program. The computer program is configured to perform the steps in the above method embodiments during running.

In another embodiment of the present disclosure, an electronic device is also provided, which may include a memory and a processor. The memory may store a computer program. The processor may be configured to run the computer program to perform the steps in the above method embodiments.

BRIEF DESCRIPTION OF THE DRAWINGS

The accompanying drawings described herein are used for providing a further understanding of the present disclosure, and constitute a part of the present disclosure, and exemplary embodiments of the present disclosure and the description thereof are used for explaining the present disclosure, but do not constitute improper limitations to the present disclosure. In the drawings:

FIG. 5 is a schematic diagram of grouping according to an optional embodiment of the present disclosure.

DETAILED DESCRIPTION

Figure 1:
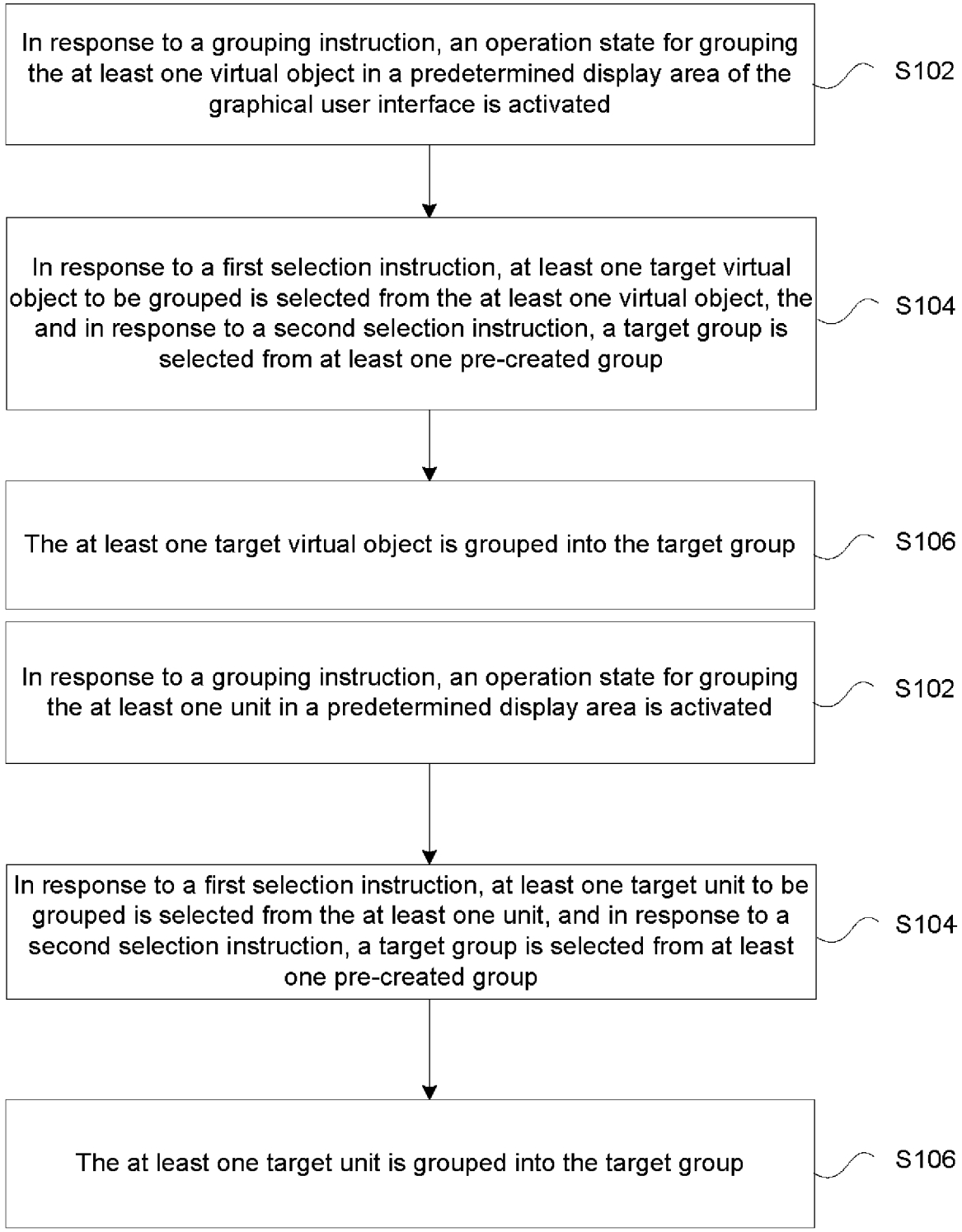
FIG. 1 is a flowchart of a virtual object grouping method according to an embodiment of the present disclosure.

The present disclosure is described below with reference to drawings and in conjunction with embodiments in detail. It is to be noted that in the case of no conflict, features in the embodiments and the embodiments in the present disclosure may be combined with each other.

It is to be noted that the specification and claims of the present disclosure and the terms "first", "second" and the like in the drawings are used for distinguishing similar objects, and do not need to describe a specific sequence or a precedence order.

As to the problems existing in the related art, in an embodiment of the present disclosure, a technical solution is provided and in this technical solution, a player can group at least one virtual object at will. The present disclosure is described below with reference to the embodiments.

In Real-Time Strategy Game (RTS, which refers to a time-based video game that centers around using resources to build virtual objects and defeat at least one opponent)

mobile games on the market, when there are multiple virtual objects in the RTS mobile games, these multiple virtual objects are usually set to enter an automatic attack mode, and the player cannot control the multiple virtual objects to move freely. In addition, the player can only control to uniformly assemble and attack, and cannot individually operate the multiple virtual objects or individually groups the multiple virtual objects. In other mobile games, although the player can operate each virtual object and further group multiple virtual objects according to the type of each virtual object, the need of the player to mix and match troops cannot be met.

Therefore, in the related art, the player has less operating space and game operability is relatively low, which also means that game playability or game depth is affected.

By means of at least some embodiments of the present disclosure, it is possible to regroup the at least one virtual object in the predetermined display area, it is not necessary to consider the type of each virtual object when grouping the at least one virtual object, and any type of virtual object can be mixed into the target group. Therefore, the problems of small player operation space and low game operability in the related art can be solved. The effects of increasing the player operation space and improving the game operability can be achieved.

FIG. 1 is a flowchart of a virtual object grouping method according to an embodiment of the present disclosure. The method is applied to a mobile terminal having at least one processor for executing a software application and a touch screen which is rendered with a graphical user interface. Contents rendered on the graphical user interface at least partially including at least one virtual object. As shown in FIG. 1, the flow includes the following steps.

At step S102, in response to a grouping instruction, an operation state for grouping the at least one virtual object in a predetermined display area is activated.

At step S104, in response to a first selection instruction, at least one target virtual object to be grouped is selected from the at least one virtual object, and in response to a second selection instruction, a target group is selected from at least one pre-created group.

At step S106, the at least one target virtual object is grouped into the target group.

The executed object that performs the above operations may be a mobile terminal.

In the above embodiment, the predetermined display area is a partial area on the graphical user interface, and the predetermined display area includes the at least one virtual object. A type (for example, a troop) of each virtual object can be unlimited, that is, any type of virtual object can be mixed into the target group.

By means of at least some embodiments of the present disclosure, it is possible to regroup the at least one virtual object in the predetermined display area, it is not necessary to consider the type of each virtual object when grouping the at least one virtual object, and any type of virtual object can be mixed into the target group. Therefore, the problems of small player operation space and low game operability in the related art can be solved. The effects of increasing the player operation space and improving the game operability can be achieved.

In an optional embodiment, a grouping control is provided on the graphical user interface. The operation that the operation state for grouping the at least one virtual object in the predetermined display area is activated in response to the grouping instruction includes that: in response to a first touch operation acting on the grouping control, at least one group number control is provided on the graphical user interface, and a current operation state of the at least one virtual object is set to a selectable operation state. In addition, it is to be noted that a mode of providing the at least one group number control and setting the selectable operation state by responding to the first touch operation is an optional mode. In actual applications, the mode of providing the at least one group number control and setting the selectable operation state may also be implemented by means of other manners, for example, by responding to a voice-activated instruction, or by receiving a control instruction triggered by pressing a specific software and hardware button or a control on the terminal, or by recognizing an instruction determined by a specific gesture, etc.

In an optional embodiment, the operation that the at least one target virtual object to be grouped is selected from the at least one virtual object in response to the first selection instruction includes that: in response to a second touch operation acting on the at least one virtual object, the at least one target virtual object to be grouped is selected from the at least one virtual object. Similarly, in addition to the above mode triggered in response to the second touch operation, the above mode for determining the at least one target virtual object to be grouped may also be implemented by means of a received voice instruction or a control instruction triggered by pressing a specific software and hardware button or a control on the terminal, or by recognizing an instruction determined by a specific gesture, etc.

In an optional embodiment, the operation that the target group is selected from at least one pre-created group in response to the second selection instruction includes that: in response to a third touch operation acting on the at least one group number control, a number corresponding to a group number control selected from the at least one group number control is determined as the target group. Similarly, in addition to the above mode triggered in response to the third touch operation, the above mode for determining the target group may also be implemented by means of a received voice instruction or a control instructions triggered by pressing a specific software and hardware button or a control on the terminal, or by recognizing an instruction determined by a specific gesture, etc.

In an optional embodiment, a control for selecting all without being grouped is provided on the graphical user interface. The method further includes that: in response to a fourth touch operation acting on the control for selecting all without being grouped, at least one virtual object having not been grouped to the at least one pre-created group is determined as the at least one target virtual object. In the present embodiment, a player can operate all ungrouped virtual objects by selecting the control for selecting all without being grouped. It is to be noted that when the at least one virtual object has not been grouped into any group before, the control for selecting all without being grouped can be selected to operate the at least one virtual object. By means of the operation, multiple ungrouped virtual objects can be quickly selected, thereby improving the selection efficiency.

In an optional embodiment, the method further includes that: the at least one target virtual object is displayed by means of at least one of the following manners: highlighting the at least one target virtual object; displaying an aperture of a predetermined color in a predetermined area corresponding to the at least one target virtual object; and displaying the at least one target virtual object according to a first display frequency. In the present embodiment, the above display modes are optional display examples. The above display modes may be used alone or in combination. In addition, other display modes may be used for highlighting.

In an optional embodiment, the method further includes that: the target group is displayed by means of at least one of the following manners: highlighting the target group; and displaying the target group according to a second display frequency. In the present embodiment, the above display modes are optional display examples. The above display modes may be used alone or in combination. In addition, other display modes may be used for highlighting.

In an optional embodiment, the method further includes that: in response to a group creation instruction, at least one new group corresponding to a creation number indicated by the group creation instruction is created. In the present embodiment, the at least one new group may be created in sequence. The at least one new group may also be created in batches. For example, two or more groups may be created at the same time. Optionally, the above operation of creating the at least one new group may be performed in a display area, and a group creation instruction input by clicking a predetermined control (for example, a "+" sign control) on the display area may be received, and then the above response operation is performed.

In an optional embodiment, after the at least one new group corresponding to the creation number indicated by the group creation instruction are created, the method further includes at least one of the following: in response to determining that the number of currently created groups reaches a predetermined threshold, a control configured to receive the grouping creation instruction is hidden; and in response to determining that the number of currently created groups exceeds the maximum number of groups displayed in a display area, a predetermined number of groups are displayed in the display area, and redundant groups are hidden. The predetermined number is less than or equal to the maximum number of groups displayed in the display area. In the present embodiment, the number of groups displayed in the display area is limited. That is, the display area can display a fixed number of groups. When the number of currently created groups exceeds the maximum number of groups displayed in the display area (or when the maximum number of groups provided in a system is reached, there is no need to consider the number of groups that can be displayed in the display area at this time, but the number of groups displayed in the display area is determined according to a system configuration), the group creation instruction can no longer be received. For example, the above control configured to receive the group creation instruction may be hidden, or the receiving function of the control configured to receive the group creation instruction may be shielded. Correspondingly, a color of the control may be adjusted, for example, the color of the control may be adjusted to gray. In the present embodiment, when the number of currently created groups exceeds the maximum number of groups displayed in the display area, a sliding view operation can be performed. That is, only a part of the groups can be displayed in the display area, and redundant groups can be hidden. When a sliding instruction is received, the displayed groups will be adjusted.

In an optional embodiment, after the redundant groups are hidden, the method further includes that: in response to a sliding operation acting on the display area, groups to be displayed in the display area are updated according to a sliding direction and sliding amplitude of the sliding operation. In the present embodiment, the displayed groups are updated by the sliding operation.

In an optional embodiment, the method further includes that: in response to a group deletion instruction, a first group is deleted from the at least one pre-created group, and in response to determining that at least one remaining virtual object existed in the first group, the at least one remaining virtual object in the first group are released. In the embodiments of the present disclosure, the entire group may be deleted, or some virtual objects in a certain group may be deleted. The process of deleting some virtual objects will be described later.

In an optional embodiment, after the first group is deleted, the method further includes that: in response to the at least one pre-created group being numbered in sequence (for example, numbered in a sequence of 1, 2, 3, 4, . . . , or numbered in a sequence of A, B, C, D, . . . , or numbered in other sequences), the numbers of remaining groups numbered after a number of the first group are adjusted, so that the remaining groups are numbered in sequence. In the present embodiment, the continuity of the serial numbers of the currently existing numbers is always maintained.

In an optional embodiment, the method further includes that: in response to a virtual object deletion instruction, at least one virtual object grouped in a second group of the at least one pre-created group is released. In the present embodiment, the received deletion instruction may also be a deletion instruction for deleting some virtual objects in a certain group. In this case, only some virtual objects in the certain group may be deleted. It is to be noted that the delete operation here is actually a process of releasing resources, namely, releasing some virtual objects.

The present disclosure is described below with reference to specific embodiments.

Figure 2:
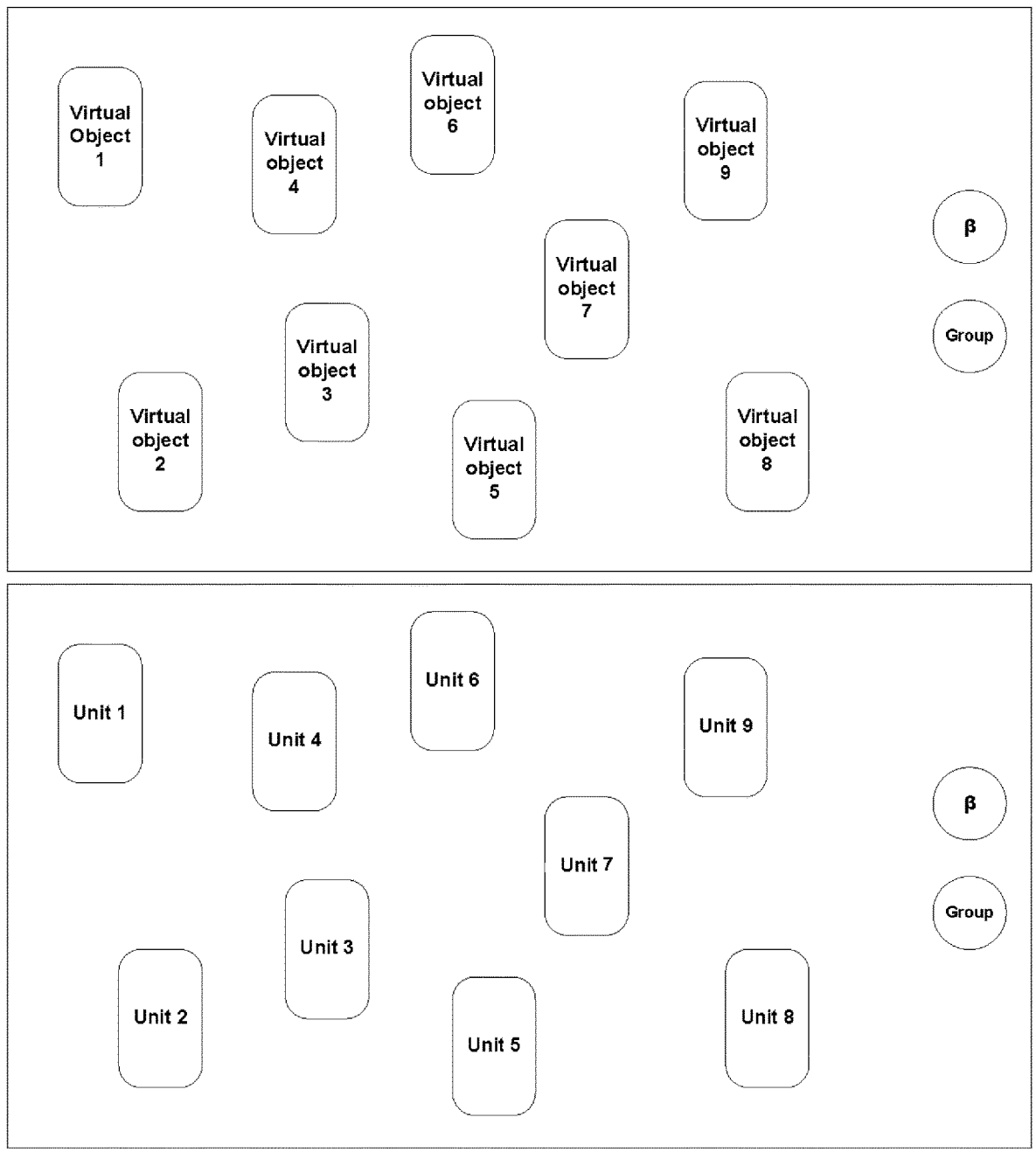
FIG. 2 is a schematic diagram of grouping according to an optional embodiment of the present disclosure.

As shown in FIG. 2, an initial state of a running game is displayed. On the right side, a "β" control (corresponding to the aforementioned control for selecting all without being grouped) and a "group" control (corresponding to the aforementioned grouping control), no one virtual object or no one group is selected by default. The "β" control on the right side represents any virtual object having not been grouped into the target group can be operated by a player.

Figure 3:
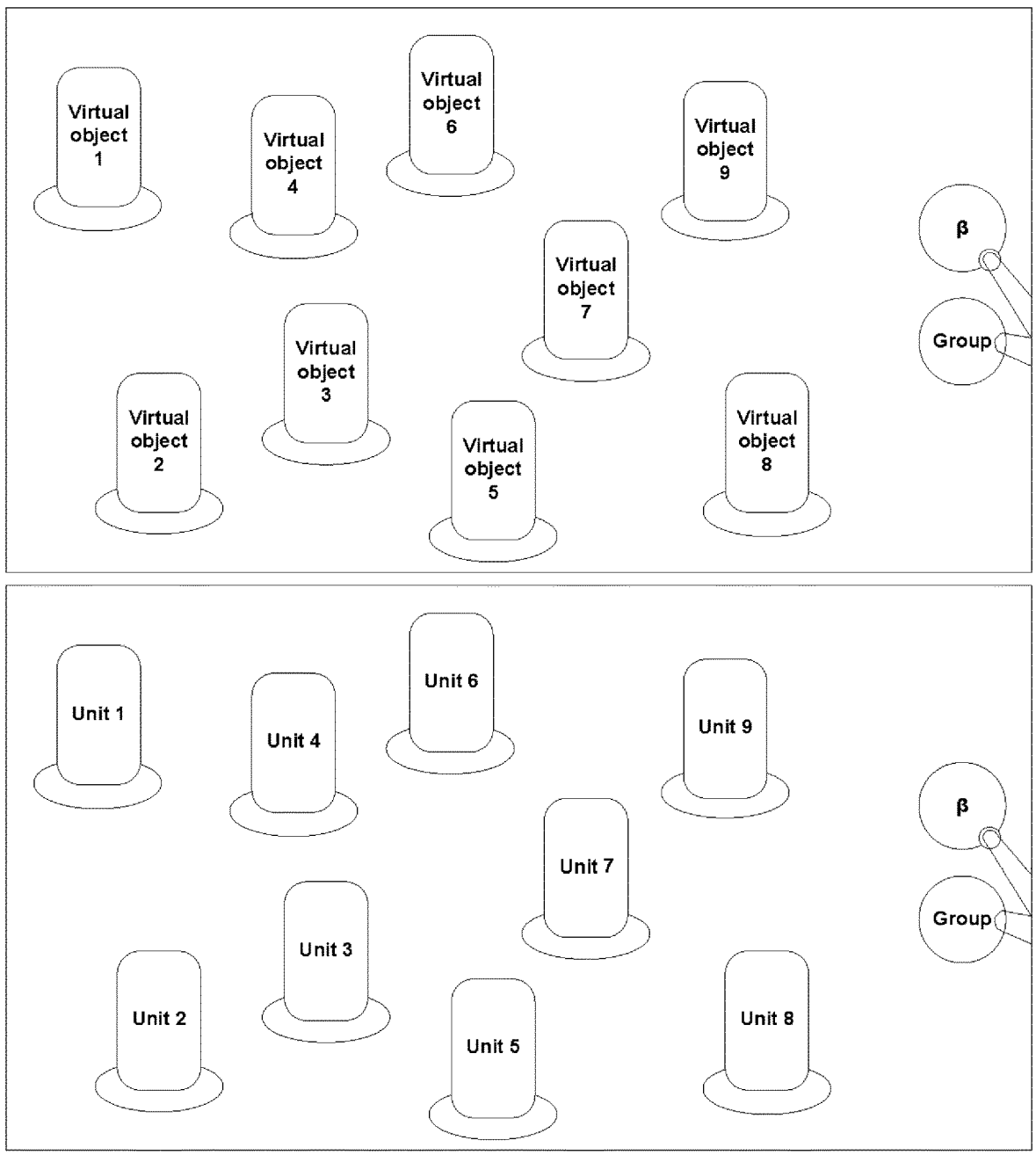
FIG. 3 is a schematic diagram of grouping according to an optional embodiment of the present disclosure.

The player may operate any virtual object having not been grouped into the target group by selecting the "β" control (as shown in FIG. 3). When there is at least one target virtual object to be individual grouped by the player, the player may operate the at least one target virtual object to be individual grouped by selecting the "β" control.

Figure 4:
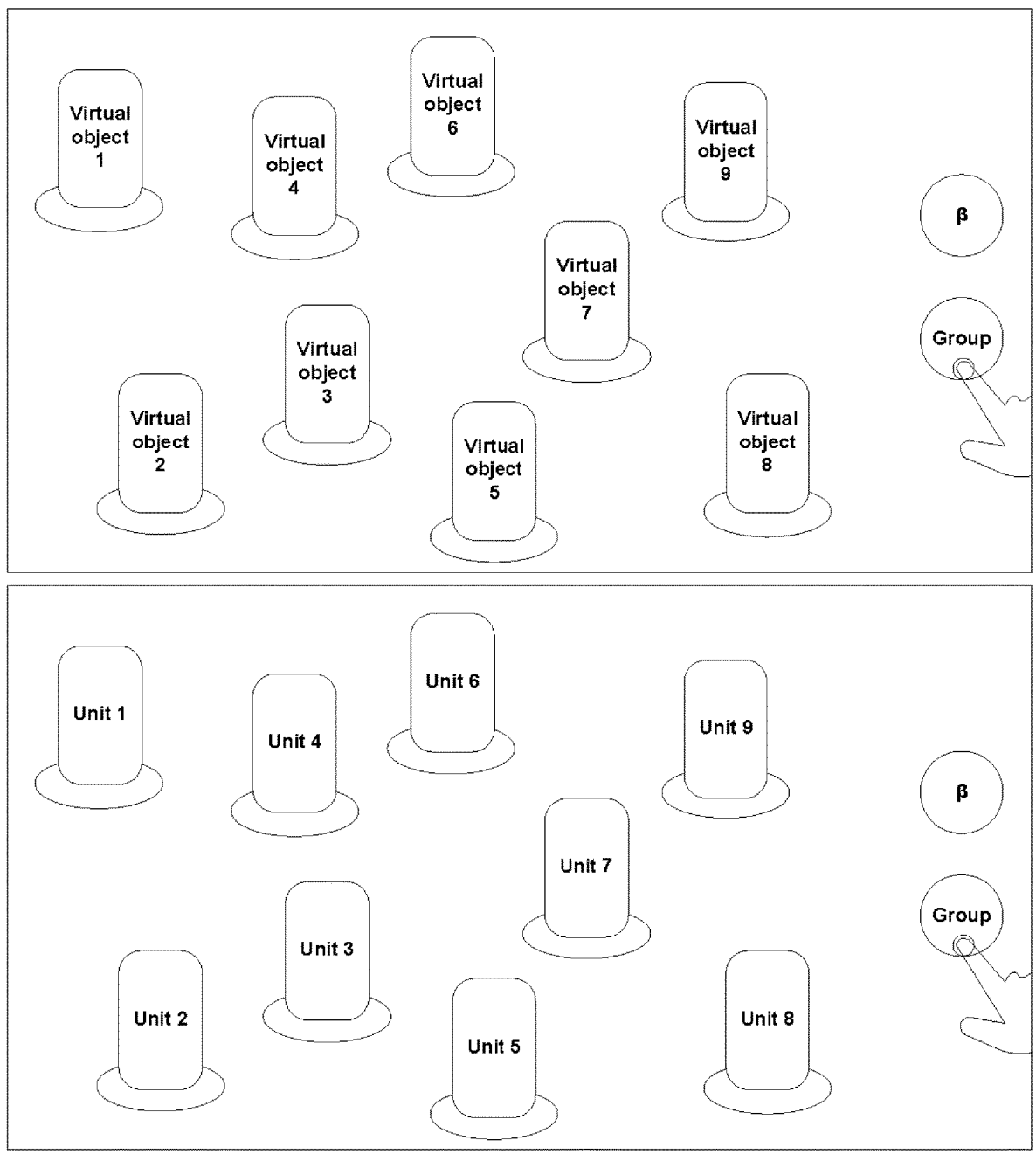
FIG. 4 is a schematic diagram of grouping according to an optional embodiment of the present disclosure.

The player may select a grouping mode by clicking the "group" control, so as to individual group the at least one target virtual object to be grouped (as shown in FIG. 4).

After entering the grouping mode, none group is selected by default. Three inactive controls "a", "b" and "c" are initially displayed by default (corresponding to the aforementioned at least one group number control). The player may click to select any virtual object or deselect any virtual object (as shown in FIG. 5). The same virtual object may be arranged in multiple groups. The player may execute the last operation instruction on the at least one virtual object grouped in any group.

Figure 6:
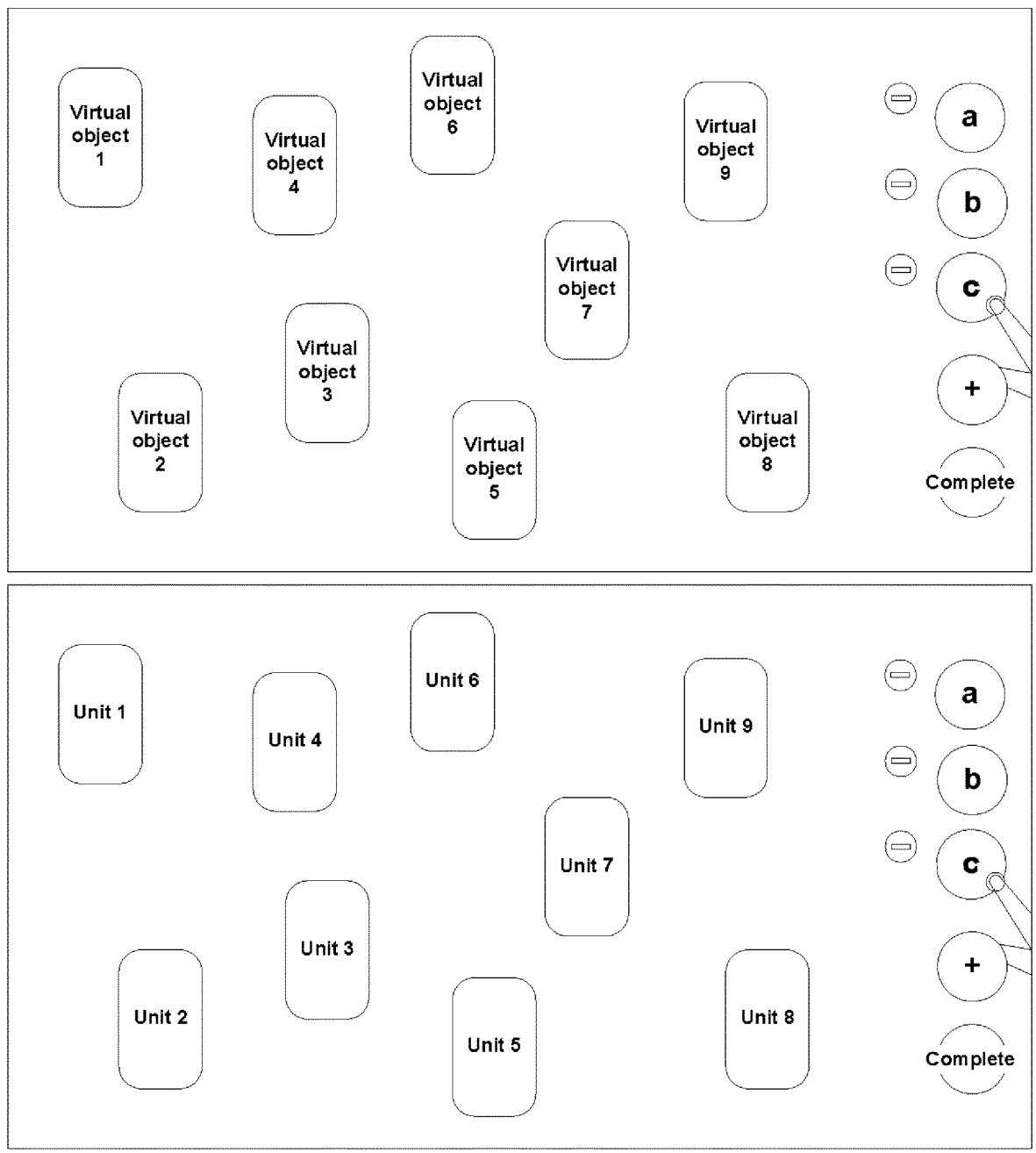
FIG. 6 is a schematic diagram of grouping according to an optional embodiment of the present disclosure.
Figure 7:
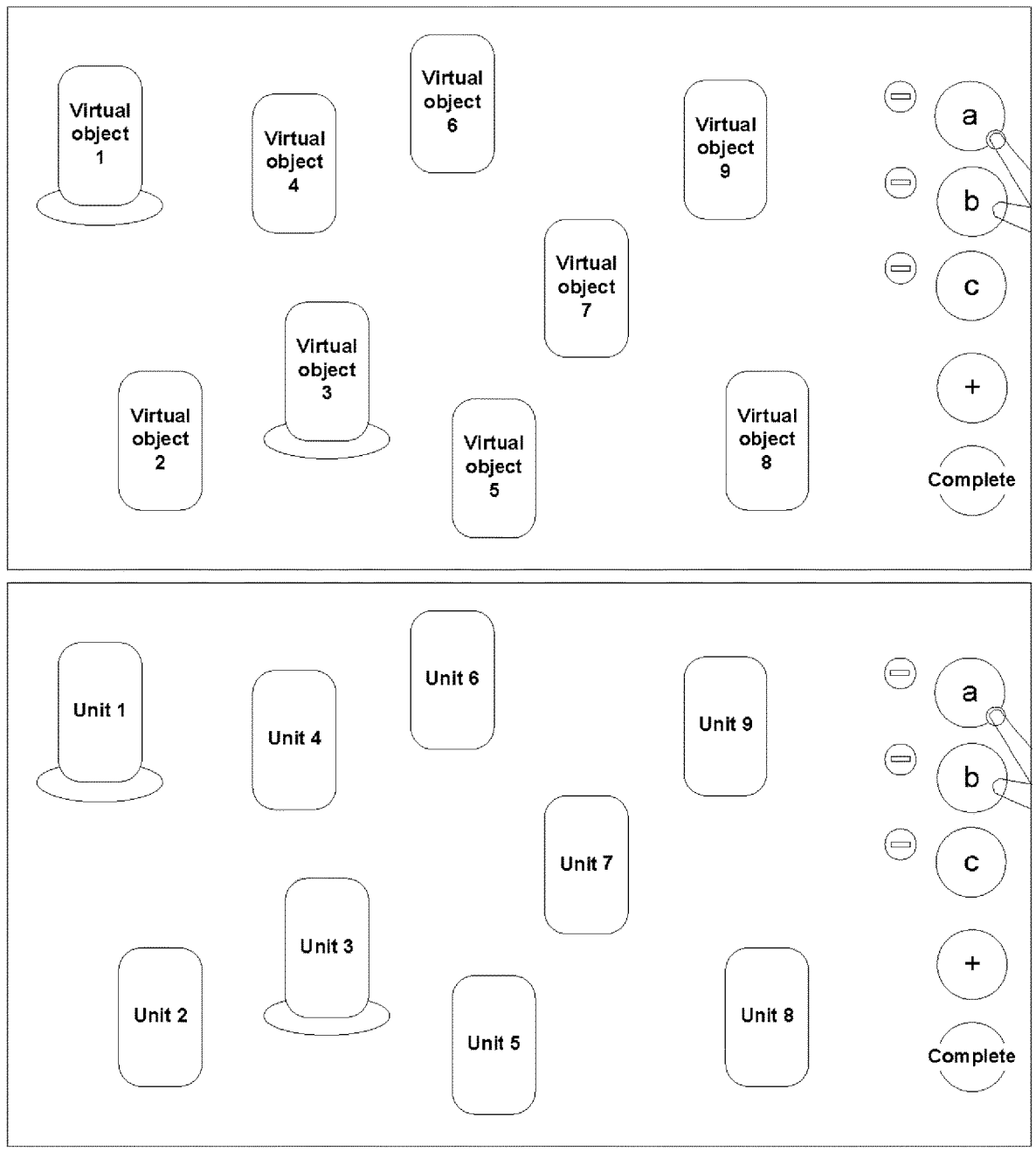
FIG. 7 is a schematic diagram of grouping according to an optional embodiment of the present disclosure.

After the selection is completed, the player may arrange the at least one selected virtual object to a group corresponding to an inactive group control (as shown in FIG. 6). The original "a", "b" and "c" controls are inactive grouping controls. After the at least one virtual object is selected, the player clicks to activate the "a" control, so that the "a" control is in an activated state. The player may also select the inactive control, and then select at least one virtual object to be grouped in a group corresponding to the inactive control (as shown in FIG. 7). When the "complete" control is clicked, a grouped result is saved and the running game may exit the grouping mode.

Figure 8:
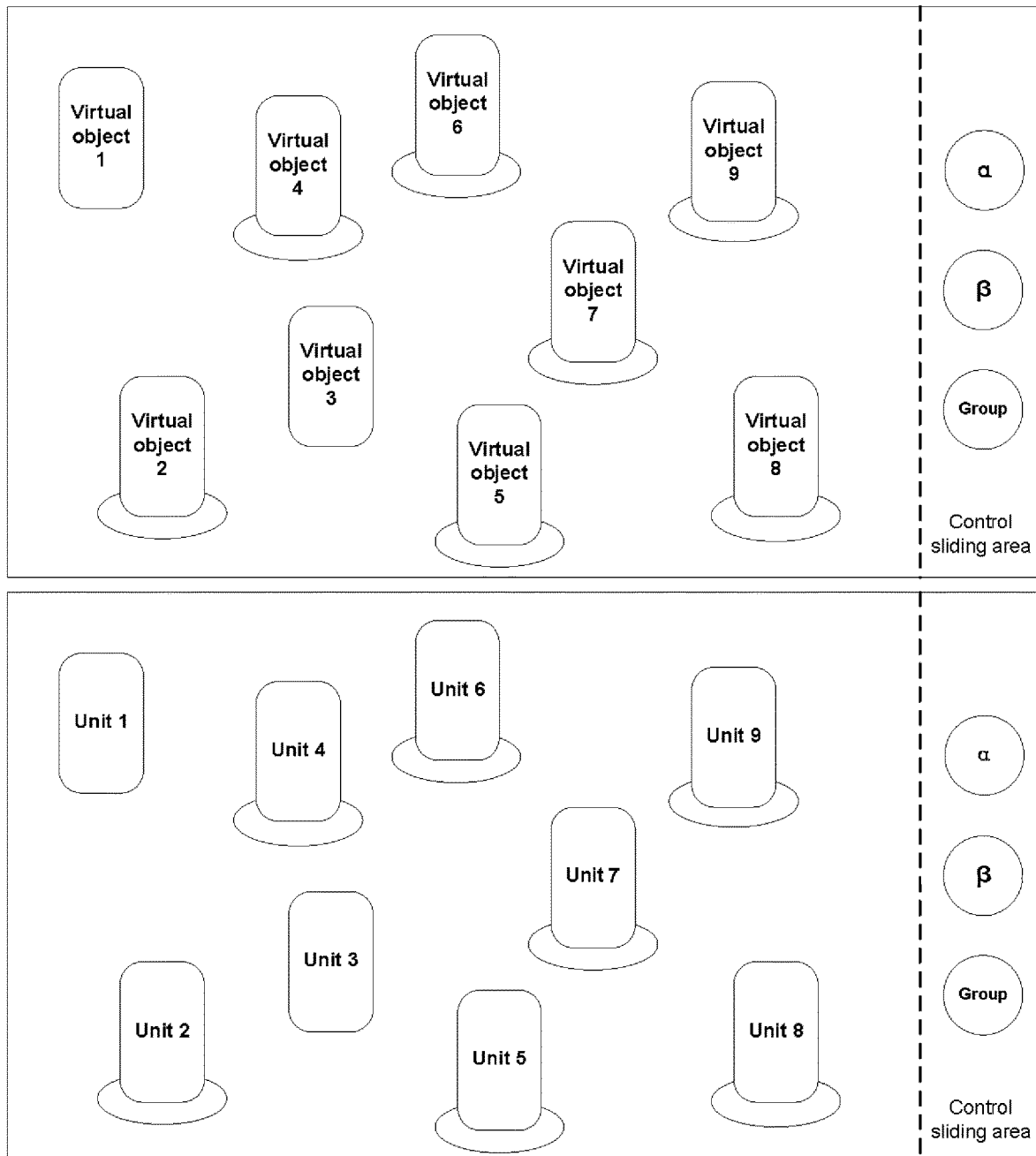
FIG. 8 is a schematic diagram of grouping according to an optional embodiment of the present disclosure.

After exiting the grouping mode, the player is kept in a selection state before entering the grouping mode, and the at least one virtual object having been grouped are removed from the at least one virtual object having not been grouped into the target group by selecting the "β" control (as shown in FIG. 8). In the "Team Bar" on the right side, the controls are centered up and down at regular intervals. When the number of currently created groups exceeds the maximum number of groups displayed in the display area of a touch screen, a sliding view operation may be performed.

Figure 9:
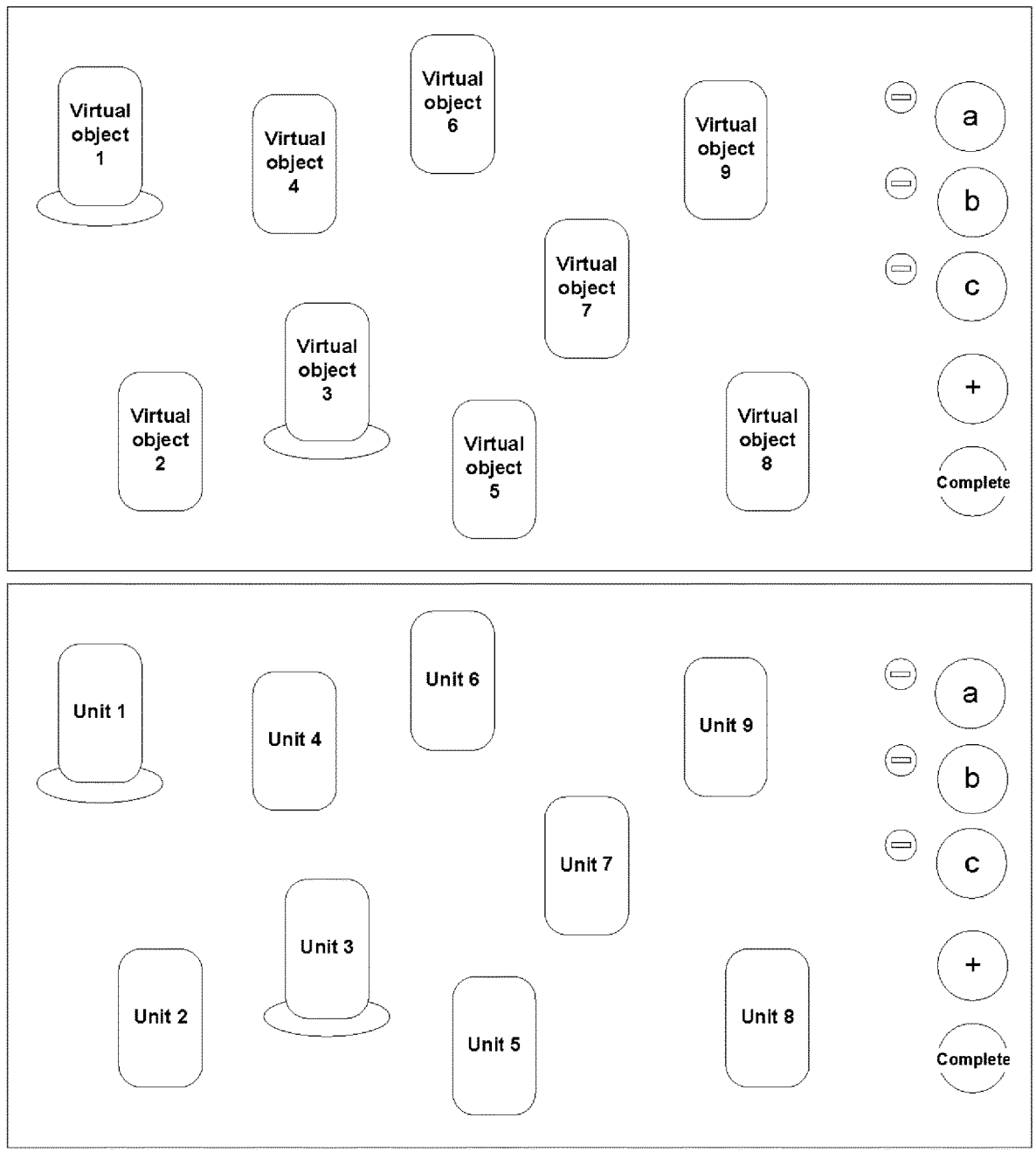
FIG. 9 is a schematic diagram of grouping according to an optional embodiment of the present disclosure.

In the grouping mode, the group control may switch among three states. As shown in FIG. 9, the "a" control represents an "activated and selected" state, the "b" control represents an "activated and unselected" state, and the "c" control represents an "inactivated" state. As shown in FIG. 9, when a group corresponding to the activated "a" control is selected, the player may re-edit this group.

In addition to a, b and c group controls by default, the player may also add new groups by clicking a "+" control. However, the number of new group may be less than or equal to the maximum number (such as seven) of groups displayed in the display area. When the number of new group reaches the maximum number, the "+" control is automatically hidden. The controls are centered up and down at regular intervals. When the number of currently created groups exceeds the maximum number of groups displayed in the display area of the touch screen, a sliding view operation may be performed (sliding area as above).

Furthermore, a "-" control is clicked to delete any group automatically. After deleting at least one group, the subsequent groups and controls may replace the at least one deleted group automatically. For instance, when a group corresponding to the "b" control is deleted, a group corresponding to the "c" control will automatically become the group corresponding to the "b" control. When the group corresponding to the "b" control has been activated, one click operation is performed on the "-" control to remove the activated state of the "b" control, and then another click operation is performed on the "-" control to delete the group corresponding to the "b" control (as shown in FIG. 9).

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In another embodiment, a virtual object grouping device is also provided, which is configured to implement the above embodiments and exemplary implementation manners, and the description thereof has been omitted. As used below, the term "component" may implement a combination of software and/or hardware of a predetermined function. Although the apparatus described in the following embodiments is preferably implemented by software, hardware or a combination of software and hardware is also possible and conceived.

Figure 10:
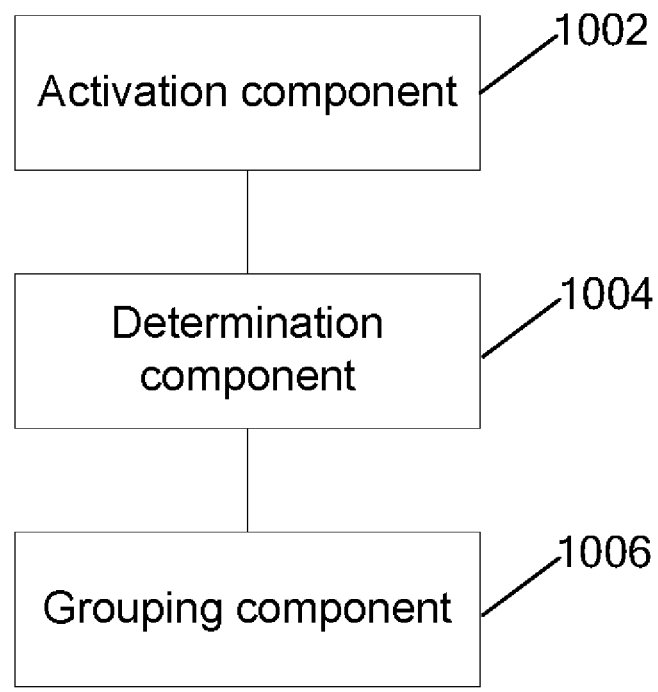
FIG. 10 is a structural block diagram of a virtual object grouping device according to an embodiment of the present disclosure.

FIG. 10 is a structural block diagram of a virtual object grouping device according to an embodiment of the present disclosure. The device may be applied to a mobile terminal having at least one processor for executing a software application and a touch screen which is rendered with a graphical user interface. Contents rendered on the graphical user interface at least partially include at least one virtual object. As shown in FIG. 10, the device includes an activation component 1002, a determination component 1004 and a grouping component 1006.

The activation component 1002 is configured to activate, in response to a grouping instruction, an operation state for grouping the at least one virtual object in a predetermined display area.

The determination component 1004 is configured to select, in response to a first selection instruction, at least one target virtual object to be grouped from the at least one virtual object, and select, in response to a second selection instruction, a target group from at least one pre-created group.

The grouping component 1006 is configured to group the at least one target virtual object to be grouped into the target group.

In an optional embodiment, a grouping control is provided on the graphical user interface. The activation component 1002 is configured to provide, in response to a first touch operation acting on the grouping control, at least one group number control on the graphical user interface, and set a current operation state of the at least one virtual object to a selectable operation state.

In an optional embodiment, the determination component 1004 may select the at least one target virtual object to be grouped by means of the following manners: in response to a second touch operation acting on the at least one virtual object, selecting the at least one target virtual object to be grouped from the at least one virtual object.

In an optional embodiment, the determination component 1004 may select the target group by means of the following manners: in response to a third touch operation acting on the at least one group number control, determining a number corresponding to a group number control selected from the at least one group number control as the target group.

In an optional embodiment, a control for selecting all without being grouped is provided on the graphical user interface. The device is further configured to determine, in response to a fourth touch operation acting on the control for selecting all without being grouped, at least one virtual object having not been grouped to the at least one pre-created group as the at least one target virtual object.

In an optional embodiment, the device is further configured to display the at least one target virtual object by means of at least one of the following manners: highlighting the at least one target virtual object; displaying an aperture of a predetermined color in a predetermined area corresponding to the at least one target virtual object; and displaying the at least one target virtual object according to a first display frequency.

In an optional embodiment, the device is further configured to display the target group by means of at least one of the following manners: highlighting the target group; and displaying the target group according to a second display frequency.

In an optional embodiment, the device is further configured to create, in response to a group creation instruction, the at least one new group corresponding to a creation number indicated by the group creation instruction.

In an optional embodiment, the device is further configured to perform, after creating the at least one new group corresponding to the creation number indicated by the group creation instruction, at least one of the following operations: in response to determining that the number of groups currently created reaches a predetermined threshold, a control configured to receive the grouping creation instruction is hidden; and in response to determining that the number of groups currently created exceeds the maximum number of groups displayed in a display area, a predetermined number of groups in the display area are displayed, and redundant groups are hidden. The predetermined number is less than or equal to the maximum number of groups displayed in the display area.

In an optional embodiment, the device is further configured to, after hiding the redundant groups, update, in response to a sliding operation acting on the display area, the groups to be displayed in the display area according to a sliding direction and sliding amplitude of the sliding instruction.

In an optional embodiment, the device is further configured to delete, in response to a group deletion instruction, a first group from the at least one pre-created group, and, in response to determining that at least one remaining virtual object existed in the first group, release the at least one remaining virtual object in the first group.

In an optional embodiment, the device is further configured to, after deleting the first group, adjust the numbers of remaining groups numbered after a number of the first group in response to the at least one pre-created group being numbered in sequence, so that the remaining groups are numbered in sequence.

In an optional embodiment, the device is further configured to release, in response to a virtual object deletion instruction, at least one virtual object grouped in a second group of the at least one pre-created group.

It is to be noted that each of the above components may be implemented by software or hardware. The latter may be implemented by, but not limited to, the following manners: the above components are all located in the same processor; or, the above components are located in different processors respectively in any combined form.

Figure 11:
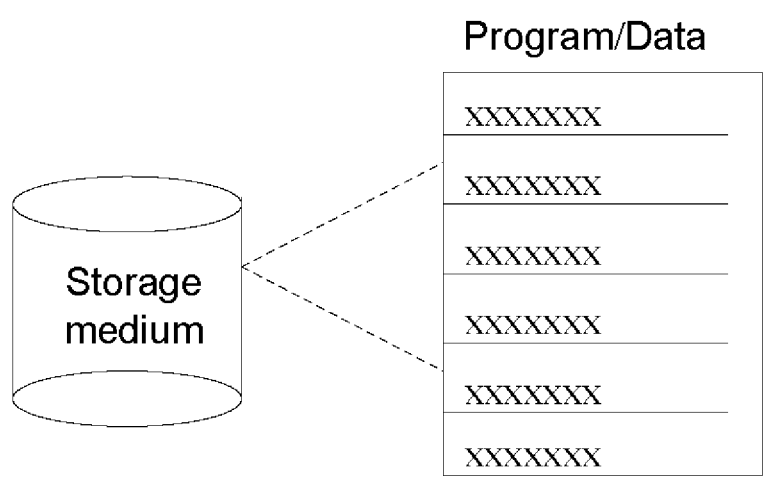
FIG. 11 is a schematic diagram of a storage medium according to an embodiment of the present disclosure.

Another embodiment of the present disclosure also provides a storage medium. FIG. 11 is a schematic diagram of a storage medium according to one embodiment of the present disclosure. The storage medium stores a computer program. The computer program is configured to be applied to a mobile terminal when run to perform the steps. The computer program is applied to a mobile terminal having at least one processor for executing a software application and a touch screen which is rendered with a graphical user interface. Contents rendered on the graphical user interface at least partially include at least one virtual object. The computer program is configured to be run to perform the following steps.

At S1, in response to a grouping instruction, an operation state for grouping the at least one virtual object in a predetermined display area is activated.

At S2, in response to a first selection instruction, at least one target virtual object to be grouped is selected from the at least one virtual object, and in response to a second selection instruction, a target group is selected from at least one pre-created group.

At S3, the target at least one target virtual object to be grouped is grouped into the target group.

By means of at least some embodiments of the present disclosure, it is possible to regroup the at least one virtual object in the predetermined display area, it is not necessary to consider the type of each virtual object when grouping the at least one virtual object, and any type of virtual object can be mixed into the target group. Therefore, the problems of small player operation space and low game operability in the related art can be solved. The effects of increasing the player operation space and improving the game operability can be achieved.

Optionally, the storage medium is configured to store the computer program for performing the following steps.

At S1-1, in response to a first touch operation acting on the grouping control, at least one group number control is provided on the graphical user interface, and a current operation state of the at least one virtual object is set to a selectable operation state. This step is a specific implementation step of step S1 in the embodiment of the storage medium.

Optionally, the storage medium is configured to store the computer program for performing the following steps.

At S2-1, in response to a second touch operation acting on at least one virtual object, the at least one target virtual object to be grouped is selected from the at least one virtual object. This step is a specific implementation step of step S2 in the embodiment of the storage medium.

Optionally, the storage medium is configured to store the computer program for performing the following steps.

At S2-2, in response to a third touch operation acting on the at least one group number control, a number corresponding to a group number control selected from the at least one group number control is determined as the target group. This step is a specific implementation step of step S2 in the embodiment of the storage medium.

Optionally, a control for selecting all without being grouped is provided on the graphical user interface. The storage medium is further configured to store the computer program for performing the following steps.

At S4, in response to a fourth touch operation acting on the control for selecting all without being grouped, at least one virtual object having not been grouped to the at least one pre-created group is determined as the at least one target virtual object.

Optionally, the storage medium is further configured to store the computer program for performing the following steps.

At S5, the at least one target virtual object is displayed by means of at least one of the following manners: highlighting the at least one target virtual object; displaying an aperture of a predetermined color in a predetermined area corresponding to the at least one target virtual object; and displaying the at least one target virtual object according to a first display frequency.

Optionally, the storage medium is further configured to store the computer program for performing the following steps.

At S6, the target group is displayed by means of at least one of the following manners: highlighting the target group; and displaying the target group according to a second display frequency.

Optionally, the storage medium is further configured to store the computer program for performing the following steps.

At S7, in response to a group creation instruction, the at least one new group corresponding to a creation number indicated by the group creation instruction is created.

Optionally, the storage medium is further configured to store the computer program for performing the following steps.

At S8, after the at least one new group corresponding to the creation number indicated by the group creation instruction are created, at least one of the following operations is performed. In response to determining that the number of groups currently created reaches a predetermined threshold, a control configured to receive the grouping creation instruction is hidden; and in response to determining that the number of groups currently created exceeds the maximum number of groups displayed in a display area, a predetermined number of groups are displayed in the display area, and redundant groups are hidden. The predetermined number is less than or equal to the maximum number of groups displayed in the display area.

Optionally, the storage medium is further configured to store the computer program for performing the following steps.

At S9, after the redundant groups are hidden, in response to a sliding operation acting on the display area, the groups to be displayed in the display area are updated according to a sliding direction and sliding amplitude of the sliding operation.

Optionally, the storage medium is further configured to store the computer program for performing the following steps.

At S10, in response to a group deletion instruction, a first group is deleted from the at least one pre-created group, and in response to determining that at least one remaining virtual object existed in the first group, the at least one remaining virtual object in the first group is released.

Optionally, the storage medium is further configured to store the computer program for performing the following steps.

At S11, after the first group is deleted, in response to the at least one pre-created group being numbered in sequence, the numbers of remaining groups numbered after a number of the first group are adjusted, so that the remaining groups are numbered in sequence.

Optionally, the storage medium is further configured to store the computer program for performing the following steps.

At S12, in response to a virtual object deletion instruction, at least one virtual object grouped in a second group of the at least one pre-created group is released.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure also provides an electronic device, which includes a memory and a processor. The memory stores a computer program. The processor is configured to run the computer program to perform the following steps.

At S1, in response to a grouping instruction, an operation state for grouping the at least one virtual object in a predetermined display area is activated.

At S2, in response to a first selection instruction, at least one target virtual object to be grouped is selected from the at least one virtual object, and in response to a second selection instruction, a target group is selected from at least one pre-created group.

At S3, the target at least one target virtual object to be grouped is grouped into the target group.

By means of at least some embodiments of the present disclosure, it is possible to regroup the at least one virtual object in the predetermined display area, it is not necessary to consider the type of each virtual object when grouping the at least one virtual object, and any type of virtual object can be mixed into the target group. Therefore, the problems of small player operation space and low game operability in the related art can be solved. The effects of increasing the player operation space and improving the game operability can be achieved.

Optionally, the processor is configured to run the computer program to perform the following steps.

At S1-1, in response to a first touch operation acting on the grouping control, at least one group number control is provided on the graphical user interface, and a current operation state of the at least one virtual object is set to a selectable operation state. This step is a specific implementation step of step S1 in the embodiment of the electronic device.

Optionally, the processor is configured to run the computer program to perform the following steps.

At S2-1, in response to a second touch operation acting on at least one virtual object, the at least one target virtual object to be grouped is selected from the at least one virtual object. This step is a specific implementation step of step S2 in the embodiment of the electronic device.

Optionally, the processor is configured to run the computer program to perform the following steps.

At S2-2, in response to a third touch operation acting on the at least one group number control, a number corresponding to a group number control selected from the at least one group number control is determined as the target group. This step is a specific implementation step of step S2 in the embodiment of the electronic device.

Optionally, a control for selecting all without being grouped is provided on the graphical user interface. The processor is further configured to run the computer program to perform the following steps.

At S4, in response to a fourth touch operation acting on the control for selecting all without being grouped, at least one virtual object having not been grouped to the at least one pre-created group is determined as the at least one target virtual object.

Optionally, the processor is further configured to run the computer program to perform the following steps.

At S5, the at least one target virtual object is displayed by means of at least one of the following manners: highlighting the at least one target virtual object; displaying an aperture of a predetermined color in a predetermined area corresponding to the at least one target virtual object; and displaying the at least one target virtual object according to a first display frequency.

Optionally, the processor is further configured to run the computer program to perform the following steps.

At S6, the target group is displayed by means of at least one of the following manners: highlighting the target group; and displaying the target group according to a second display frequency.

Optionally, the processor is further configured to run the computer program to perform the following steps.

At S7, in response to a group creation instruction, the at least one new group corresponding to a creation number indicated by the group creation instruction is created.

Optionally, the processor is further configured to run the computer program to perform the following steps.

At S8, after the at least one new group corresponding to the creation number indicated by the group creation instruction are created, at least one of the following operations is performed. In response to determining that the number of groups currently created reaches a predetermined threshold, a control configured to receive the grouping creation instruction is hidden; and in response to determining that the number of groups currently created exceeds the maximum number of groups displayed in a display area, a predetermined number of groups are displayed in the display area, and redundant groups are hidden. The predetermined number is less than or equal to the maximum number of groups displayed in the display area.

Optionally, the processor is further configured to run the computer program to perform the following steps.

At S9, after the redundant groups are hidden, in response to a sliding operation acting on the display area, the groups to be displayed in the display area are updated according to a sliding direction and sliding amplitude of the sliding operation.

Optionally, the processor is further configured to run the computer program to perform the following steps.

At S10, in response to a group deletion instruction, a first group is deleted from the at least one pre-created group, and in response to determining that at least one remaining virtual object existed in the first group, the at least one remaining virtual object in the first group is released.

Optionally, the processor is further configured to run the computer program to perform the following steps.

At S11, after the first group is deleted, in response to the at least one pre-created group being numbered in sequence, the numbers of remaining groups numbered after a number of the first group are adjusted, so that the remaining groups are numbered in sequence.

Optionally, the processor is further configured to run the computer program to perform the following steps.

At S12, in response to a virtual object deletion instruction, at least one virtual object grouped in a second group of the at least one pre-created group is released.

Figure 12:
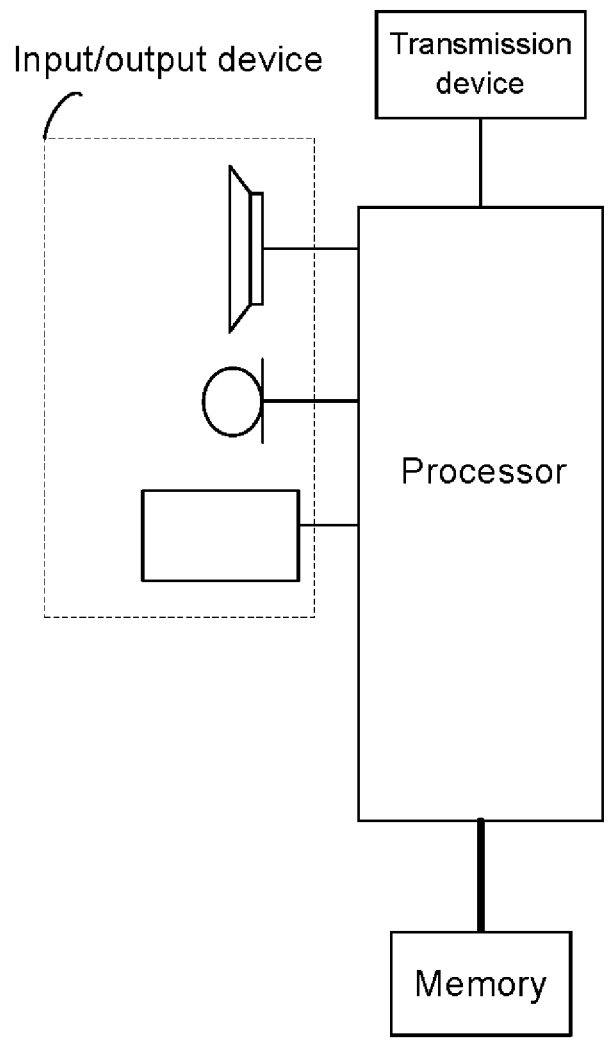
FIG. 12 is a schematic diagram of an electronic device according to an embodiment of the present disclosure.

Optionally, the electronic device may further include a transmission device and an input/output device. The transmission device is connected to the processor, and the input/output device is connected to the processor. FIG. 12 is a schematic diagram of an electronic device according to an embodiment of the present disclosure.

Optionally, a specific example in the present embodiment may refer to the examples described in the above embodiments and optional implementation manners, and details are not described herein in the present embodiment.

Through the above embodiments, the following beneficial effects can be achieved.

The design of the quick formation can help players to operate each virtual object more accurately and freely or arrange groups, which meets the player's psychological expectations and operation wishes.

The player efficiency and freedom of grouping the at least one virtual object is increased.

For RTS games, the increased operating space of each virtual object means that the game playability will also be effectively improved.

Obviously, those skilled in the art should understand that the above-mentioned components or steps of the present disclosure may be implemented by a general-purpose computing device, and the above-mentioned components or steps of the present disclosure may be centralized on a single computing device or distributed on a network composed of multiple computing devices. Optionally, the above-mentioned components or steps of the present disclosure may be implemented with program codes executable by a computing device, so that the above-mentioned components or steps of the present disclosure may be stored in a storage device and executed by the computing device. And in some cases, the steps shown or described may be performed in a different order than here, or the steps shown or described are separately made into individual integrated circuit components, or multiple components or steps therein are made into a single integrated circuit component for implementation. As such, the present disclosure is not limited to any particular combination of hardware and software.

The above are the exemplary embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A virtual object grouping method, applied to a mobile terminal having at least one processor for executing a software application and a touch screen which is rendered with a graphical user interface, contents rendered on the graphical user interface at least partially comprising at least one virtual object, the method comprising:
   in response to a grouping instruction, activating an operation state for grouping the at least one virtual object in a predetermined display area of the graphical user interface;
   in response to a first selection instruction, selecting at least one target virtual object to be grouped from the at least one virtual object, and displaying the at least one target virtual object on the graphical user interface;
   in response to a second selection instruction, selecting a target group from at least one pre-created group,
   grouping the at least one target virtual object to be grouped into the target group, and displaying the target group on the graphical user interface; and
   in response to an operation instruction for the target group, operating the at least one target virtual object grouped into the target group uniformly, wherein the grouping instruction, the first selection instruction, the second selection instruction and the operation instruction are execution instructions input to the mobile terminal.

2. The method as claimed in claim 1, wherein a grouping control is provided on the graphical user interface, and in response to the grouping instruction, activating the operation state for grouping the at least one virtual object in the predetermined display area comprises:
   in response to a first touch operation acting on the grouping control, providing at least one group number control on the graphical user interface, and setting a current operation state of the at least one virtual object to a selectable operation state.

3. The method as claimed in claim 2, wherein in response to the first selection instruction, selecting the at least one target virtual object to be grouped from the at least one virtual object comprises:
   in response to a second touch operation acting on the at least one virtual object, selecting the at least one target virtual object to be grouped from the at least one virtual object.

4. The method as claimed in claim 2, wherein in response to the second selection instruction, selecting the target group from at least one pre-created group comprises:

in response to a third touch operation acting on the at least one group number control, determining a number corresponding to a group number control selected from the at least one group number control as the target group.

5. The method as claimed in claim 1, wherein a control for selecting all without being grouped is provided on the graphical user interface, the method further comprises:
   in response to a fourth touch operation acting on the ungrouped and select all control, determining at least one virtual object having not been grouped to the at least one pre-created group as the at least one target virtual object.

6. The method as claimed in claim 1, further comprising:
   displaying the at least one target virtual object by means of at least one of the following manners:
   highlighting the at least one target virtual object;
   displaying an aperture of a predetermined color in a predetermined area corresponding to the at least one target virtual object; and
   displaying the at least one target virtual object according to a first display frequency.

7. The method as claimed in claim 1, further comprising:
   displaying the target group by means of at least one of the following manners:
   highlighting the target group; and
   displaying the target group according to a second display frequency.

8. The method as claimed in claim 1, further comprising:
   in response to a group creation instruction, creating at least one new group corresponding to a creation number indicated by the group creation instruction.

9. The method as claimed in claim 8, wherein after creating the at least one new group corresponding to the creation number indicated by the group creation instruction, the method further comprises at least one of the following:
   in response to determining that the number of groups currently created reaches a predetermined threshold, hiding a control configured to receive the grouping creation instruction; and
   in response to determining that the number of groups currently created exceeds the maximum number of groups displayed in a display area, displaying a predetermined number of groups in the display area and hiding redundant groups, the predetermined number being less than or equal to the maximum number of groups displayed in the display area.

10. The method as claimed in claim 9, wherein after hiding the redundant groups, the method further comprises:
    in response to a sliding operation acting on the display area, updating groups to be displayed in the display area according to a sliding direction and sliding amplitude of the sliding operation.

11. The method as claimed in claim 9, wherein a color of the control configured to receive the grouping creation instruction is adjusted to a preset color.

12. The method as claimed in claim 9, wherein a part of groups is displayed in the display area, redundant groups are hidden, and in response to a sliding instruction, displayed groups are adjusted.

13. The method as claimed in claim 8, wherein the at least one new group is created in sequence.

14. The method as claimed in claim 8, wherein the at least one new group is created in batches.

15. The method as claimed in claim 1, further comprising:
    in response to a group deletion instruction, deleting a first group from the at least one pre-created group, and in response to determining that at least one remaining virtual object existed in the first group, releasing the at least one remaining virtual object in the first group.

16. The method as claimed in claim 15, wherein after deleting the first group, the method further comprises:
    in response to the at least one pre-created group being numbered in sequence, adjusting numbers of remaining groups numbered after a number of the first group, so that the remaining groups are numbered in sequence.

17. The method as claimed in claim 1, further comprising:
    in response to a virtual object deletion instruction, releasing at least one virtual object grouped in a second group of the at least one pre-created group.

18. A non-transitory storage medium, storing a computer program, wherein the computer program is configured to perform the method as claimed in claim 1 during running.

19. An electronic device, comprising a memory and a processor, wherein the memory stores a computer program, and the processor is configured to run the computer program to perform the method as claimed in claim 1.

20. The method as claimed in claim 1, wherein the predetermined display area is a partial area on the graphical user interface.

* * * * *